(12) United States Patent
Schloemer et al.

(10) Patent No.: US 7,596,917 B2
(45) Date of Patent: Oct. 6, 2009

(54) SEALING COVER FOR A FASTENING DEVICE

(75) Inventors: Horst Schloemer, Utting (DE); Bernd Trautwein, Broken Arrow, OK (US)

(73) Assignee: Hilti Aktiengesellschaft, Schaan (LI)

( * ) Notice: Subject to any disclaimer, the term of this patent is extended or adjusted under 35 U.S.C. 154(b) by 584 days.

(21) Appl. No.: 11/255,721

(22) Filed: Oct. 21, 2005

(65) Prior Publication Data

US 2007/0125036 A1     Jun. 7, 2007

(30) Foreign Application Priority Data

Oct. 23, 2004   (DE) ................. 10 2004 051 739

(51) Int. Cl.
*E02D 27/00* (2006.01)
(52) U.S. Cl. .................. 52/293.3; 52/705; 52/258
(58) Field of Classification Search ........... 52/169.14, 52/300, 301, 293.3, 296, 705, 294, 295, 678; 405/302.1, 302.2; 411/546, 82, 930, 258, 411/439
See application file for complete search history.

(56) References Cited

U.S. PATENT DOCUMENTS

| | | | | |
|---|---|---|---|---|
| 4,102,239 A | * | 7/1978 | Dallas | 411/531 |
| 4,412,407 A | * | 11/1983 | Melfi et al. | 52/699 |
| 4,614,070 A | * | 9/1986 | Idland | 52/296 |
| 4,750,306 A | * | 6/1988 | Granieri | 52/251 |
| 4,872,298 A | * | 10/1989 | Klemic, Jr. | 52/127.1 |
| 5,050,364 A | * | 9/1991 | Johnson et al. | 52/705 |
| 5,060,436 A | * | 10/1991 | Delgado, Jr. | 52/295 |
| 5,562,377 A | * | 10/1996 | Giannuzzi et al. | 411/82 |
| 5,628,587 A | * | 5/1997 | Lesslie | 405/302.1 |
| 5,857,817 A | * | 1/1999 | Giannuzzi et al. | 411/82.3 |
| 5,895,186 A | * | 4/1999 | Giannuzzi et al. | 411/82 |
| 6,035,595 A | * | 3/2000 | Anderson | 52/363 |
| 6,105,332 A | * | 8/2000 | Boyadjian | 52/698 |
| 7,445,192 B2 | * | 11/2008 | Gridley et al. | 249/207 |

FOREIGN PATENT DOCUMENTS

| | | |
|---|---|---|
| AT | 0358800 | 2/1980 |
| DE | 9509418 | 11/1996 |
| DE | 9615155 | 11/1996 |
| DE | 19947913 A1 | 5/2001 |
| DE | 0317103 | 5/2004 |
| DE | 0361751 | 7/2004 |

* cited by examiner

*Primary Examiner*—Richard E Chilcot, Jr.
*Assistant Examiner*—Anthony N Bartosik
(74) *Attorney, Agent, or Firm*—Abelman, Frayne & Schwab

(57) ABSTRACT

A sealing cover for a fastening device (26) for a spaced attachment of an object (5) to a constructional component includes a base plate (12) having a through-opening (13) for an anchoring element (27) of the fastening device (26) and at least one inlet opening (17), and a first circumferential web (14) projecting from the base plate (12) and forming therewith a receiving space (16) for receiving, at least partially, a spacing element (28) of the fastening device.

11 Claims, 2 Drawing Sheets

SEALING COVER FOR A FASTENING DEVICE

BACKGROUND OF THE INVENTION

1. Field of the Invention

The present invention relates to a sealing cover for a fastening device for a spaced attachment of an object to a constructional component and including a base plate having a through-opening for an anchoring element of the fastening device and a circumferential web projecting from the base plate and forming therewith a receiving space for receiving, at least partially, a spacing element of the fastening device. The present invention also relates to the fastening device with a sealing cover.

2. Description of the Prior Art

Constructional components such as e.g., support outer walls of buildings are provided, on many occasions for an adequate thermal isolation, with a thermal insulating facing with a non-load bearing layer, formed, e.g., of polysterene. For protection from weather influences such as humidity, the outer surface of the facing is provided with a protective layer, e.g., with an outer rendering. Such façades, which have a thermal insulating facing glued thereto, are sometimes called thermal insulation composite system-façades. In addition, there are bracket-mounted façade systems in which the facing is secured to the constructional component in a spaced relationship thereto with an appropriate support structure so that air can circulate between the facing and the constructional component for removing the penetrated moisture. Further, thermal insulating rendering systems, transparent thermal insulation systems, or double wall masonry belong to façade systems with a no-load bearing layer. Other constructional components such as, e.g., building ceilings can also be provided with facings, e.g., in form of a suspended ceilings.

The facings themselves are often not suitable for heavy objects to be attached thereto and for absorbing the attachment forces. In order to attach heavy objects to constructional components, anchoring elements such as, e.g., threaded rods, which extend through the facings and are anchored with expansion or adhesive dowels, are used. In order to prevent, e.g., penetration of moisture in the thermal insulation of an outer wall along the anchoring element, the existing gaps are sealed, e.g., with a silicone sealing. The attachable objects are secured on the projected section of the anchoring element.

The secured object, e.g., an awning or the like, is subjected to action of wind-and-weather-dependent forces acting parallel to the constructional component.

Thereby, because of the spaced attachment of an object, considerable moment forces act on the anchoring element and means that provides for its anchoring in the constructional component. These forces lead to rocking of the anchoring element. The rocking of the anchoring element can result in damage of the outer protective layer of the facing or at least in damage of the sealing that prevents penetration of the moisture.

In order to prevent, with a spaced-from-a constructional component attachment, application of pressure to a non-load bearing layer, e.g., to the pressure-sensitive protection layer, an anchoring element, e.g., a threaded rod, which is anchored in the constructional component, is provided with a spacing element formed, e.g., of metal and having a through-opening for the anchoring element. The spacing element, which has a greater outer diameter than the anchoring element, is cut to a length corresponding to the depth of the facing or to the distance between the to-be-attached object and the constructional component, and is inserted in an opening formed in the facing in accordance with dimensions of the spacing element. The attachable object is tensioned with respect to the spacing element and thereby with respect to the upper surface of the constructional component by the anchoring element. The bearing surface of the spacing element, which abuts the constructional component, transmits thereto forces acting parallel to the surface of the constructional component.

A drawback of the above-described fastening device consists in that for a perfect functioning of the fastening device, the spacing element should be cut to a length exactly corresponding to the facing thickness and should be deburred, if needed. This requires an increased time during mounting of each object in a spaced relationship to a constructional component which is associated with a need to prepare a separate attachment point for the object. In addition, when the bearing surface of the spacing element is formed smaller than required, the time-variable compression forces, which press the spacing element against the constructional component, can cause rocking of the anchoring element, with all of the above-mentioned drawbacks.

With a thermally insulated façade, the outer diameter of the spacing element cannot be arbitrarily increased in order to provide a greater bearing surface of the spacing element for bearing against the constructional component for transmitting thereto developing compression forces. This is because at the attachment point, an undesired thermal bridge is formed.

German Publication DE 199 47 913 A1 discloses a fastening device having a sleeve-shaped spacing element and at least one load application element that is screwed into the spacing element, with the spacing element being anchored directly or indirectly, in the constructional component with an adhesive. The spacing element has, in a loaded condition of the fastening device, only a very small bearing surface that bears against the constructional component. This can cause penetration of the spacing element into the constructional component under load. This spacing element also requires cutting to an exact length and subsequent treatment.

German Utility Model DE 295 09 418 U1 discloses a fastening device for a spaced attachment of an awning holder to an outer wall of a building and provided with an external insulation. The fastening device has an anchoring element designed to be anchored in a constructional component, a first sleeve section provided with an outer thread, and a second sleeve section provided with an inner thread. Both sleeve sections have a through-opening for the anchoring element and are mounted in the facing in an opening corresponding to the dimensions of the second sleeve section. The second sleeve section has a base plate and a first circumferential web projecting from the base plate and having an inner thread. The formed receiving space is designed for at least partially receiving the second sleeve section. Both sleeve sections, which are screwed into each other, are adapted to the available, at the attachment point, thickness of the facing and the protective layer, by being rotated relative to each other.

The drawback of the above-described fastening device consists in that the sleeve sections and, in particular, the thread should have large dimension for transmitting the existing forces. Therefore, this device is characterized by high manufacturing costs which is a serious drawback, in particular, with a large number of attachment points. In addition, a large opening should be formed in the facing for insertion of the sleeve sections, which leads to formation of an undesired thermal bridge, e.g., in a thermally insulated façade.

Accordingly, an object of the present invention is a sealing cover for a fastening device for a spaced attachment of an object to a constructional component and a fastening device with a sealing cover, which are easily adaptable to existing site conditions, are easily mountable, and can be economically produced.

Another object of the present invention is a sealing cover and a fastening device with a sealing cover capable of transmission of large forces, with the necessary dimensions being reduced to a minimum.

SUMMARY OF THE INVENTION

These and other objects of the present invention, which will become apparent hereinafter, are achieved by providing a sealing cover including a base plate having a through-opening for an anchoring element of the fastening device and at least one inlet opening, and a first circumferential web projecting from the base plate and forming therewith a receiving space for receiving, at least partially, a spacing element of the fastening device; and by providing a fastening device having such a sealing cover.

Firstly, an opening, which extends up to the surface of a constructional component, is formed in the facing and the protective layer, then, the available thickness is measured at the site at the attachment point. Simultaneously, or later a bore for anchoring the anchoring element with an expansion or adhesive dowel is formed in the constructional component. The anchoring element has a first end provided with an anchoring section, and a second end having at least one attachment section. The anchoring element is formed as a threaded rod or an anchor rod. The anchoring element is formed advantageously of stainless steel.

Alternatively, another extension-proof, preferably corrosion-resistant and substantially thermally non-conductive material, such as, e.g., a glass-fiber reinforced plastic material can be used for forming the anchoring elements.

The spacing element is advantageously formed of a compression-proof, optionally corrosion-resistant, preferably substantially thermally non-conductive material, e.g., a suitable plastic material. The spacing element has a through-opening for the anchoring element and is cut off of a tubular semiproduct to a length corresponding to the measured thickness minus a predetermined length by a suitable tool. As it would be explained further below, when cutting-off the spacing element to a length, no attention to the exact length of the spacing element and the squareness of the cut should be paid.

Therefore, the cut can be carried out rapidly and simply on the site, without spending much time. Further, much less cutting waste is produced because the precision of the cut is not important as it does not result in a non-usable spacing element. In order to obtain a rough orientation of the position of a to be produced cut, advantageously, there are provided appropriate marks on the circumference of the tubular semiproduct. The marks can be made in form of indentations, e.g., for guiding a useable cutting tool. The marks can also be formed as predetermined breaking points which, if necessary, make possible to produce a spacing element with a predetermined length without use of a tool, by breaking the semiproduct transverse to its longitudinal extent. The bearing surface of the spacing elements, which is designed to lie on the constructional component is covered with an adhesive such as, e.g., a hardenable glue. After the adhesive has been applied to the bearing surface, the spacing element is inserted in the preliminary formed bore, with the adhesive being compressed between the spacing element and the constructional component, with the existing unevennesses of the constructional component being compensated. After hardening of the adhesive, a completely flat, compression-proof abutment of the spacing element on the constructional component is obtained, which insures a uniform transmission of compression forces to the anchor base.

The sealing cover is produced, advantageously of a compression-proof, optionally corrosion-resistant, and, preferably substantially thermally non-conductive material, e.g., plastic material by an injection-molding process. The sealing cover is advanced against the spacing element, with the first web being pushed telescopically over the spacing element until the base plate of the sealing cover lies in the plane of the facing or in the plane of the protective layer. The free end of the first web surrounds the free end of the spacing element. Through the inlet opening in the base plate, the filling mass, preferably, a free-flowing hardenable mass such as, e.g., as a two-component injection mortar, is poured in the existing empty space of the receiving space of the sealing cover for fixing the formed distance of the fastening device. After the filling mass has hardened, the spacing element, the hardened filling mass, and the sealing cover form a compression-proof element that supports the object which is secured to the constructional component at a distance therefrom. For sealing of an existing gap between the sealing cover and the protective layer, the facing can be provided with sealing means, preferably, a silicone material which is weather-resistant to a most possible extent.

With the inventive sealing cover and the inventive fastening device with sealing cover, the time of anchoring of the anchoring element in the constructional component can be adapted to site conditions, in particular, to the desired course of assembly. E.g., firstly, the anchoring element can be anchored in the constructional component, then the spacing element can be inserted, and, finally, the sealing cover can be pushed over the anchoring element, with the empty space of the receiving space of the sealing cover being subsequently filled with the filling mass. Alternatively, firstly, the spacing element can be mounted on the constructional component, and the anchoring element is advanced through the spacing element for being anchored in the constructional component. Finally, the sealing cover is pushed over the anchored anchoring element, with the existing empty space in the receiving space of the sealing cover being filled with the filling mass. According to another non-limiting embodiment of the process, firstly the spacing element is mounted on the constructional component, then the sealing cover is placed over the spacing element, and finally, the anchoring element is introduced through both the sealing cover and the spacing element for being anchored in the constructional component. Thereafter, the empty space of the receiving space of the sealing cover is filled with the filling mass.

Advantageously, the base plate is also provided with an outlet opening, so that upon filling the empty space with the filling mass, the air trapped therein can be displaced therefrom. Thereby, formation of air inclusion during filling of the empty space with the filling mass, is prevented. The filling mass is poured through the inlet opening until it can be seen in the outlet opening or until it exits the outlet opening. The at least one outlet opening can, thus, serve for controlling a correct filling of the empty space.

Advantageously, there is provided, in the region of the through-opening, a circumferential second web extending parallel to the first web. The first web and the second web provide a receiving space limited from outside and from inside for at least partially receiving the spacing element. The second web limit the receiving space of the to-be-filled empty space with respect to the anchoring element or the through-openings in the sealing cover and the spacing element. The dimensions of the first and second webs are advantageously so selected that they operatively prevent exit of the filling mass from the empty space between the sealing cover and the spacing element, insuring, however, that the sealing cover can be pushed over the spacing element. With the inventive embodiment of the sealing cover, another assembly sequence is possible when, firstly, the spacing element is mounted on the constructional component, the sealing cover is pushed over the spacing element, and the empty space of the receiving space of the sealing cover is filled with the filling mass. The anchoring element can be introduced through the formed compression-proof element for being anchored in the constructional component.

Advantageously, the first web and/or the second web project from the base plate, so that the outer surface of the sealing cover can, in the mounted condition, be formed flat, providing for directly placing of the to-be-attached object thereon or for application of the protective layer to the facing, which, in addition to the facing, protects from moisture also the formed attachment point.

Advantageously, the first web is arranged on the base plate at a distance from the outer circumference of the base plate, whereby a circumferential collar is formed. The collar provides, on one hand, a stop for the sealing cover during its mounting and, on the other hand, a bearing surface, e.g., for adhesive, such as glue. Thereby, the sealing cover, upon abutting the protective layer or the facing adheres thereto, so that it cannot be shifted when the empty space of the sealing cover is filled with the filling mass, providing an exact attachment point for the to-be attached object. In addition, the bearing surface can serve for supporting sealing means used for sealing a possible gap between the sealing cover and the protective layer or the facing. Furthermore, the inventive sealing cover can be used for covering and sealing a possible lacerated edge of an opening formed in the facing or the protective layer. Dependent on the selected material, the sealing means can have, in addition to a sealing function, also a bonding function. The bonding force between the sealing cover and the facing or the protective layer prevents the sealing cover from being displaced away from the facing or the protective layer upon filling the empty space of the sealing cover with filling material.

Advantageously, the first circumferential web is provided with elevations which extend in the extension direction of the first web and at least partially penetrate in the surrounding material upon mounting of the sealing cover. Thereby, due to the clamping action, the sealing cover remains in an aligned position upon filling of the empty space. Preferably, the elevations are wedge-shaped. Thereby, the sealing cover can be easily mounted, and a greater clamping action is applied to the sealing cover on the outer side of the facing. This improves the action of the holding force acting on the sealing cover, in particular, when a protective layer is provided on the facing. The holding force acting between the sealing cover and the facing or the protective layer, prevents the sealing cover from being displaced outwardly upon filling the empty space. Alternatively, the elevation can be formed as strips.

Advantageously, the base plate has, at least regionwise, a rough structure. The rough structure is provided, e.g., on the side of the base plate from which the first web projects, insuring for a better bonding of the filling mass to the base plate. This provides for transmission of the transverse forces. Additionally or alternatively, for an improved bonding of the protective layer to the sealing plate, the opposite, remote from the constructional component, side of the base plate is also provided with a rough structure.

Advantageously, the base plate is circular with, optionally, the first and second webs being concentrically arranged thereon. Thereby, an annular space for receiving, at least partially, the spacing element is formed. The opening in the facing can be formed, e.g., with a core drill and has a circular cross-section. A circular cylindrical hollow member, which serves as the spacing element, is placed in the so formed opening. As it has already been discussed previously, the spacing element is cut to length from a tubular semi-product.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
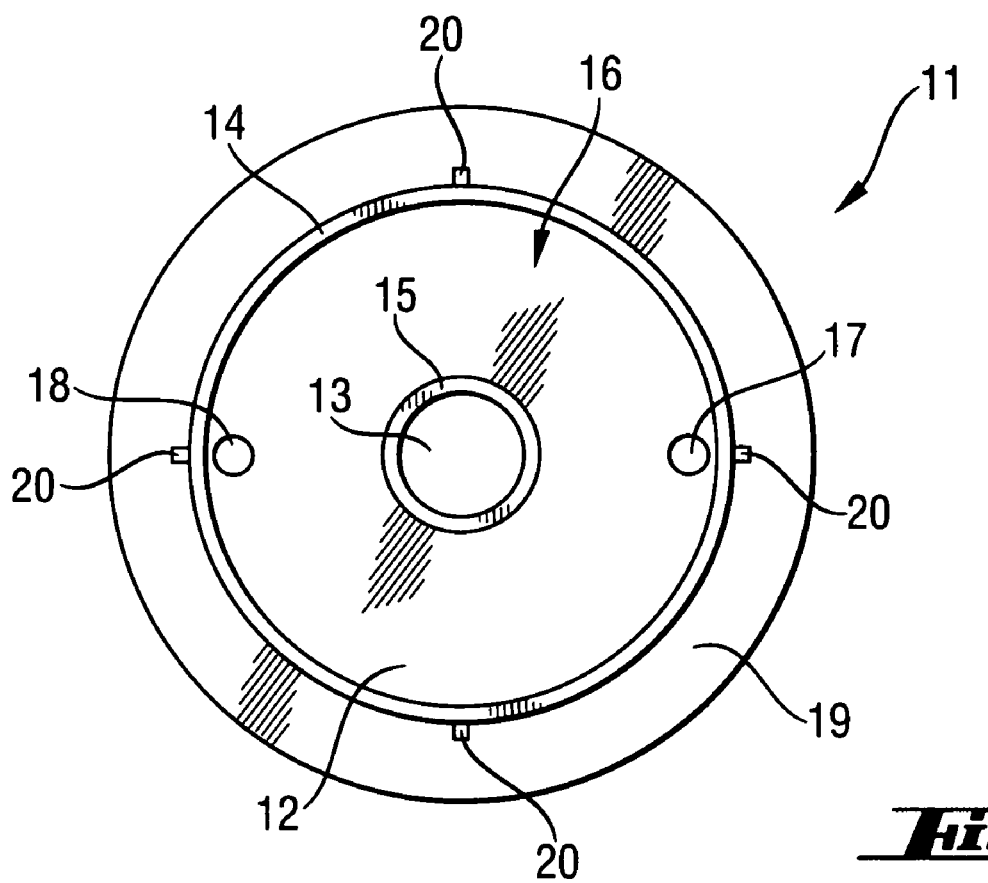
FIG. 1 a top view of a sealing cover according to the present invention.
Figure 2:
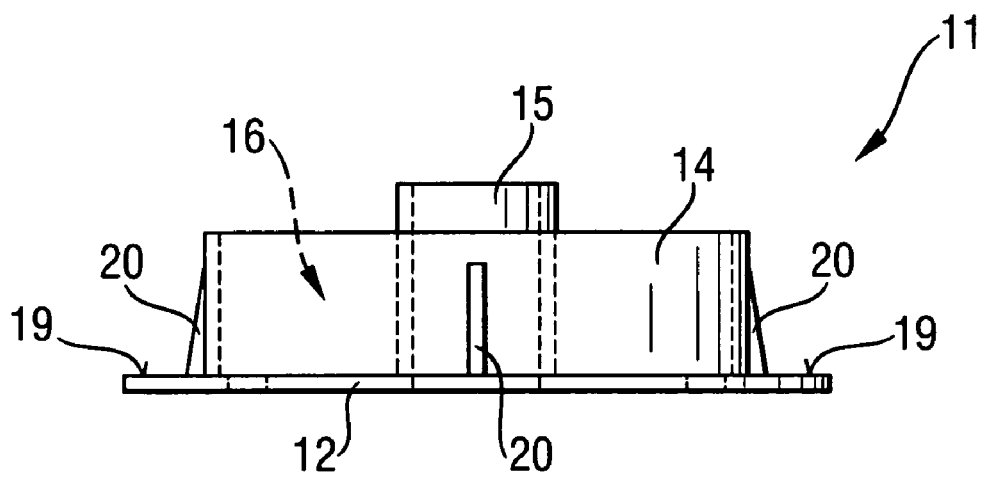
FIG. 2 a side view of the sealing cover shown in FIG. 1.

A sealing cover 11 according to the present invention for a fastening device for a spaced attachment of an object to a constructional component, which is shown in FIGS. 1-2, has a circular base plate 12 having a through-opening 13 for an anchoring element of the fastening device. On the base plate 12, there are provided a first circumferential web 14 that is spaces from the outer circumference of the base plate 12, and a second circumferential web 15 that is provided in the region of the through-opening 13. With the first circumferential web 14 being spaced from the outer circumference of the base plate 12, there is formed a collar with a bearing surface 19.

The first web 14 and the second web 15 extend parallel to each other and are arranged concentrically on the base plate 12. The first and second webs 14 and 15 form, together with the base plate 12, an annular receiving space 16 for receiving a spacing element of the fastening device. Both the first web 14 and the second web 15 project longitudinally from the base plate 12, with the longitudinal extent of the second web 15 being greater than the longitudinal extent of the first web 14, so that the second web 15 serves as a guide upon mounting of the sealing cover 11. The surface of the base plate 12 between the first web 14 and the second web 15 has a rough structure. In the longitudinal direction of the first web 14, there are provided thereon four strip-shaped elevations 20 uniformly distributed over and extending radially from the circumference of the first web 14 and extending parallel to the longitudinal direction to project from the base plate 12. Each elevation 20 has a shape of a wedge, with the radial extension of each elevation 20 increasing in the longitudinal direction toward the base plate 12.

Figure 3:
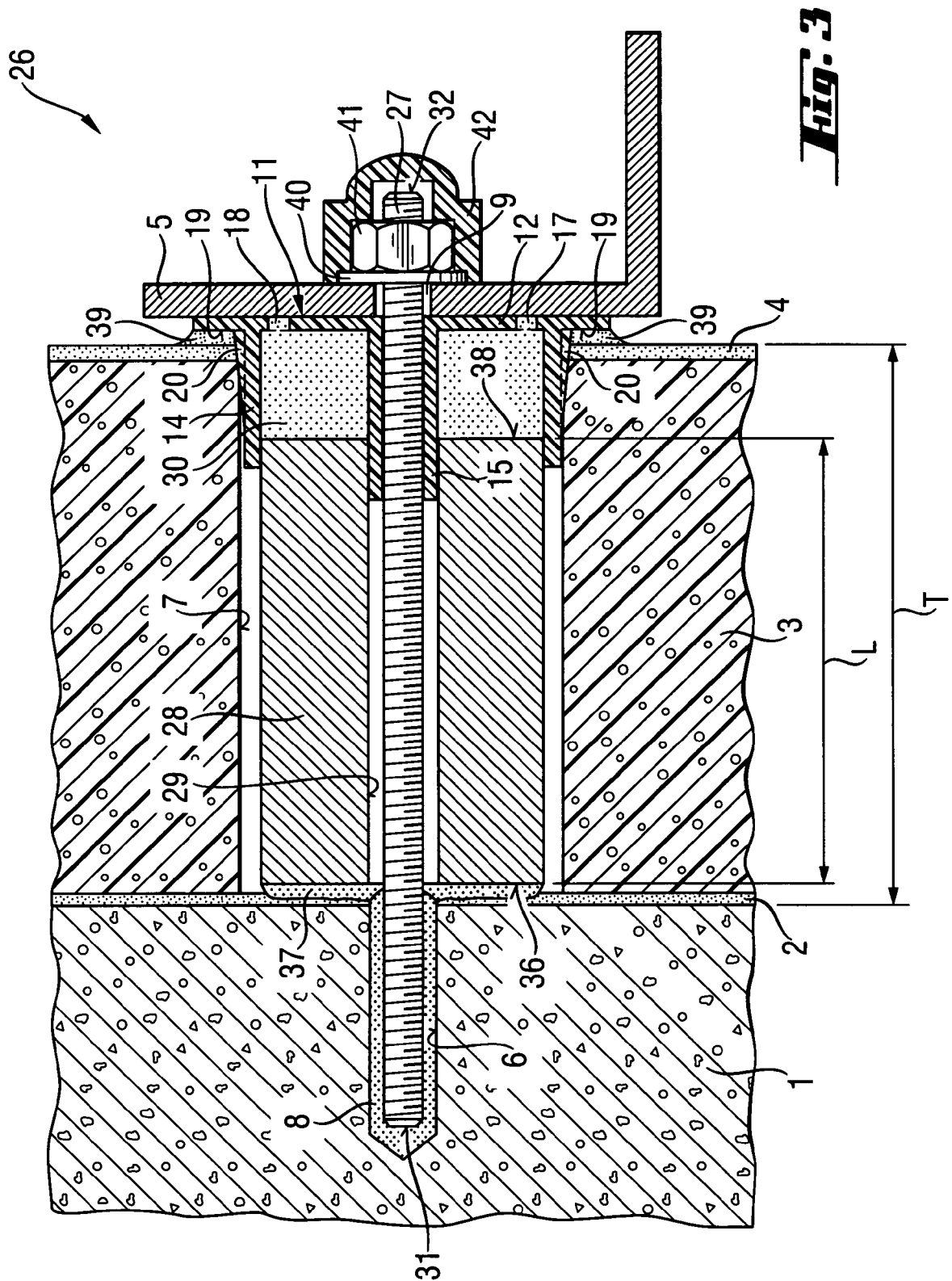
FIG. 3 a cross-sectional view of a fastening device with the sealing cover shown in FIGS. 1-2.

FIG. 3 shows an inventive fastening device 26 for a spaced attachment of an object 5 to a constructional component 1. The object 5 is formed, e.g., as an awning holder that should be secured on a building outer wall provided with a thermal insulating facing 3. The thermal insulating facing 3 is secured to the constructional component 1 with an adhesive 2 and is provided with a protective layer 4 in form of a rendering. The fastening device 26 has an anchoring element 27 having a first end 31 with an anchoring section and a second end 32 with an attachment section, a spacing element 28 having a through-opening 29 for the anchoring element 27, and a sealing cover 11. The empty space between the free end of the spacing element 28 and the sealing cover 11 is filled with a filling mass 30.

A possible mounting process of the fastening device 26 will be described based on FIG. 3. At a predetermined or desired location, there is provided, through the facing 3, a bore 6 in the constructional component 1 for the anchoring element 27. The bore 6 is filled with an adhesive mortar 8, e.g., using adhesive mortar cartridges. Then, a through-opening 7 is formed, e.g., with a core drill through the protective layer 4, facing 3, and the adhesive 2, with the previously formed bore, which forms the bore 6, serving as a centering bore for the core drill. Finally, the depth T of the through-opening 7 is measured.

Based on the measured depth T, from a tubular semiproduct, the spacer element 28 is cut off with a length smaller than the depth T to provide space for a bridging non-load bearing layer. The length L of the cut-off spacing element 28 corresponds approximately to the depth T minus 1 cm. To the end 36 of the spacing element 28, which in a mounting condition would lie on the constructional component 1, there is applied a small amount of a hardenable, and, therefore, compression-proof, two-component injection mortar that forms an adhesive layer 37. Thereafter, the spacing element 28 is inserted through the opening 7 until it abuts the constructional component 1.

Then, a sealing mass 39 is applied to the bearing surface 19 of the sealing cover 11, and the sealing cover 11 is pushed over the free end 38 of the spacing element 28, with the first web 14 and the second web 15 facing forward, until the sealing cover 11 lies on the protective layer 4. Upon pressing the sealing cover 11 against the protective layer 4, the sealing mass 39 is pressed out sidewise and forms a reliable, advantageously, elastic seal against penetration of moisture. Upon insertion of the sealing cover, the elevations 20, which are formed on the outer circumference of the first web 14, penetrate at least partially, in the surrounding material. Thereby, in addition to the adhesive action of the sealing mass 39, the sealing cover 11 is reliably held in a predetermined position. Through the inlet opening 17 in the base plate 12, the empty space between the spacing element 28 and the sealing cover 11 is filled with a free-flowing hardenable filling mass 30 in form of a two-component injection mortar, using a suitable injection tool (not shown). The filling takes place until the filling mass 30 appears at the outlet opening 18 or exits therethrough.

The anchoring element 27 is inserted through the through-opening 13 in the base plate 12 of the sealing cover 11 and through the through-opening 29 of the spacing element 28 and is screwed into the adhesive mortar 8 that fills the bore 6. Upon hardening of the adhesive mortar 8, the anchoring element 27 becomes anchored in the constructional component 1.

After the filling mass 30 has been hardened, the spacing element 28, the hardened filling mass 30, and the sealing cover 11 form together a compression-proof element on which the to-be-secured object 5, which has a bore 9, is secured with the anchoring element 27, a washer 40, and a nut 41. With the nut 41 being rigidly tightened, the fastening device 26 transmits a pressure force from the object 5 to the constructional component 1, with the anchoring element 27 absorbing the corresponding tensile load. For protection from corrosion, for optical reasons and/or for a better thermal insulation, a plastic cover cap 42 can be arranged above the anchoring element 27, the washer 40, and the nut 41.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A fastening system comprising:
    a filling mass (30);
    an internal space; and
    a fastening device (26) for a spaced attachment of an object (5) to a constructional component (1), the fastening device (26) including:
        an anchoring element (27) having:
            a first end (31) with an anchoring section; and
            a second end (32) having at least one fastening section;
        a spacing element (28) having a through-opening (29) for the anchoring element (27); and
        a sealing cover (11) including:
            a base plate (12) having a through-opening (13) for the anchoring element (27) of the fastening device (26) and at least one inlet opening (17); and
            a first circumferential web (14) projecting longitudinally from the base plate (12) and forming therewith a receiving space (16) for receiving, at least partially, the spacing element (28) of the fastening device;
    wherein the internal space is located between a top portion of the spacing element (28) and the base plate (12) of the sealing cover (11), and the internal space is filled with the filling mass (30) which is inserted through the at least one inlet opening (17).

2. A fastening system according to claim 1, wherein the filling mass (30) is a free-flowing hardenable mass.

3. A fastening system according to claim 2, wherein the filling mass (30) is a two-component injection mortar.

4. A fastening system according to claim 1, wherein the base plate (12) has at least one outlet opening (18).

5. A fastening system according to claim 1, further comprising a second circumferential web (15) arranged in a region of the through-opening (13) of the base plate (12), projecting longitudinally from the base plate (12), and extending longitudinally parallel to the first circumferential web (14).

6. A fastening system according to claim 1, wherein the first circumferential web (14) is spaced from an outer circumference of the base plate (12).

7. A fastening system according to claim 1, wherein the first circumferential web (14) is provided with elevations (20) extending longitudinally from the base plate (12) parallel to the longitudinal direction of the first circumferential web (14).

8. A fastening system according to claim 7, wherein the elevations (20) are wedge-shaped.

9. A fastening system according to claim 1, wherein the base plate (12) has, at least regionwise, a rough structure.

10. A fastening system according to claim 1, wherein the base plate (12) is circular.

11. A fastening system according to claim 10, further comprising a second circumferential web (15) arranged in a region of the through-opening (13) of the base plate (12), projecting longitudinally from the base plate (12), and extending longitudinally parallel to the first circumferential web (14);
    wherein the first circumferential web (14) and the second circumferential web (15) are concentrically arranged on the base plate (12).

* * * * *

UNITED STATES PATENT AND TRADEMARK OFFICE
CERTIFICATE OF CORRECTION

PATENT NO. : 7,596,917 B2  Page 1 of 1
APPLICATION NO. : 11/255721
DATED : October 6, 2009
INVENTOR(S) : Schloemer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Twenty-eighth Day of September, 2010

David J. Kappos
*Director of the United States Patent and Trademark Office*